(12) United States Patent
Smentkowski (10) Patent No.: US 12,441,256 B1
(45) Date of Patent: Oct. 14, 2025

(54) PROTECTIVE FRAME FOR VEHICLE STICKERS

(71) Applicant: Matthew Smentkowski, Lincoln Park, NJ (US)

(72) Inventor: Matthew Smentkowski, Lincoln Park, NJ (US)

( * ) Notice: Subject to any disclaimer, the term of this patent is extended or adjusted under 35 U.S.C. 154(b) by 189 days.

(21) Appl. No.: 18/369,885

(22) Filed: Sep. 19, 2023

(51) Int. Cl.
*B60R 13/10* (2006.01)

(52) U.S. Cl.
CPC ....... *B60R 13/105* (2013.01); *B60Y 2200/142* (2013.01)

(58) Field of Classification Search
CPC ..................................................... B60R 13/105
See application file for complete search history.

(56) References Cited

U.S. PATENT DOCUMENTS

| | | | | |
|---|---|---|---|---|
| 3,304,642 | A * | 2/1967 | Dardis | B60R 13/105 D11/116 |
| 4,314,417 | A * | 2/1982 | Cain | B60R 13/105 40/643 |
| 4,707,939 | A * | 11/1987 | Bonner | B60R 13/00 40/643 |
| 4,891,895 | A * | 1/1990 | DeLaquil, Jr. | B60R 13/10 40/201 |
| D312,066 | S | 11/1990 | Fabbrini | |
| 5,622,389 | A * | 4/1997 | Courtney | B42D 15/00 283/117 |
| 5,771,619 | A * | 6/1998 | Wells | G09F 21/04 40/643 |
| 5,983,539 | A * | 11/1999 | Martin | G09F 7/002 40/655 |
| 6,027,235 | A * | 2/2000 | Chen | B60Q 1/56 362/544 |
| 6,385,876 | B1 * | 5/2002 | Mc Kenzie | B60R 13/10 40/201 |
| 6,393,747 | B1 | 5/2002 | Lewis | |
| 6,718,667 | B2 | 4/2004 | Applebee | |
| 7,143,533 | B2 | 12/2006 | Burke | |
| 7,257,912 | B2 | 8/2007 | Yang | |
| 7,535,343 | B1 * | 5/2009 | Pinckney | G09F 21/04 40/575 |
| 7,836,618 | B1 | 11/2010 | Parenti | |

(Continued)

FOREIGN PATENT DOCUMENTS

WO     2014002107     1/2014

*Primary Examiner* — Gary C Hoge
(74) *Attorney, Agent, or Firm* — Kyle A. Fletcher, Esq.

(57) ABSTRACT

The protective frame for vehicle stickers is a display that is configured for use with an IFTA registration sheeting. The protective frame for vehicle stickers displays the IFTA registration sheeting. The protective frame for vehicle stickers is configured for use with a tractor. The protective frame for vehicle stickers mounts on the exterior surface of the tractor such that the IFTA registration sheeting is visibly displayed. The protective frame for vehicle stickers includes a display plate structure, a bezel structure, a window structure, a plurality of gaskets, and a fastening structure. The fastening structure secures the protective frame for vehicle stickers to the tractor. The IFTA registration sheeting mounts on the display plate structure. The bezel structure, the window structure, and the plurality of gaskets forms a protected space surrounding the IFTA registration sheeting.

7 Claims, 5 Drawing Sheets

(56) References Cited

U.S. PATENT DOCUMENTS

| | | | |
|---|---|---|---|
| 9,352,685 B1* | 5/2016 | Abramowitz | B60Q 1/44 |
| 2002/0078608 A1* | 6/2002 | Paulhill | B60R 13/105 |
| | | | 40/201 |
| 2003/0026978 A1 | 2/2003 | Nicoleau | |
| 2003/0182829 A1* | 10/2003 | Simonazzi | B60R 13/105 |
| | | | 40/200 |
| 2006/0277803 A1 | 12/2006 | Cotta | |
| 2015/0360624 A1 | 12/2015 | Reynolds | |
| 2021/0188197 A1* | 6/2021 | Gaitan | G09F 21/048 |
| 2024/0395150 A1* | 11/2024 | Sengstaken, Jr. | B60R 13/10 |

* cited by examiner

PROTECTIVE FRAME FOR VEHICLE STICKERS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of the mounting and display of a license or a registration. (B60R13/105)

SUMMARY OF INVENTION

The protective frame for vehicle stickers is a display. The protective frame for vehicle stickers is configured for use with an IFTA registration sheeting. The protective frame for vehicle stickers displays the IFTA registration sheeting. The protective frame for vehicle stickers is configured for use with a tractor. The protective frame for vehicle stickers mounts on the exterior surface of the tractor such that the IFTA registration sheeting is visibly displayed. The protective frame for vehicle stickers comprises a display plate structure, a bezel structure, a window structure, a plurality of gaskets, and a fastening structure. The fastening structure secures the protective frame for vehicle stickers to the tractor. The IFTA registration sheeting mounts on the display plate structure. The bezel structure, the window structure, and the plurality of gaskets form a protected space surrounding the IFTA registration sheeting.

These together with additional objects, features and advantages of the protective frame for vehicle stickers will be readily apparent to those of ordinary skill in the art upon reading the following detailed description of the presently preferred, but nonetheless illustrative, embodiments when taken in conjunction with the accompanying drawings.

In this respect, before explaining the current embodiments of the protective frame for vehicle stickers in detail, it is to be understood that the protective frame for vehicle stickers is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the protective frame for vehicle stickers.

It is therefore important that the claims be regarded as including such equivalent construction insofar as they do not depart from the spirit and scope of the protective frame for vehicle stickers. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The protective frame for vehicle stickers 100 (hereinafter invention) is a display. The invention 100 is configured for use with an IFTA registration sheeting 106. The invention 100 displays the IFTA registration sheeting 106. The invention 100 is configured for use with a tractor 107. The invention 100 mounts on the exterior surface of the tractor 107 such that the IFTA registration sheeting 106 is visibly displayed. The invention 100 comprises a display plate structure 101, a bezel structure 102, a window structure 103, a plurality of gaskets 104, and a fastening structure 105. The fastening structure 105 secures the invention 100 to the tractor 107. The IFTA registration sheeting 106 mounts on the display plate structure 101. The bezel structure 102, the window structure 103, and the plurality of gaskets 104 forms a protected space surrounding the IFTA registration sheeting 106.

Figure 1:
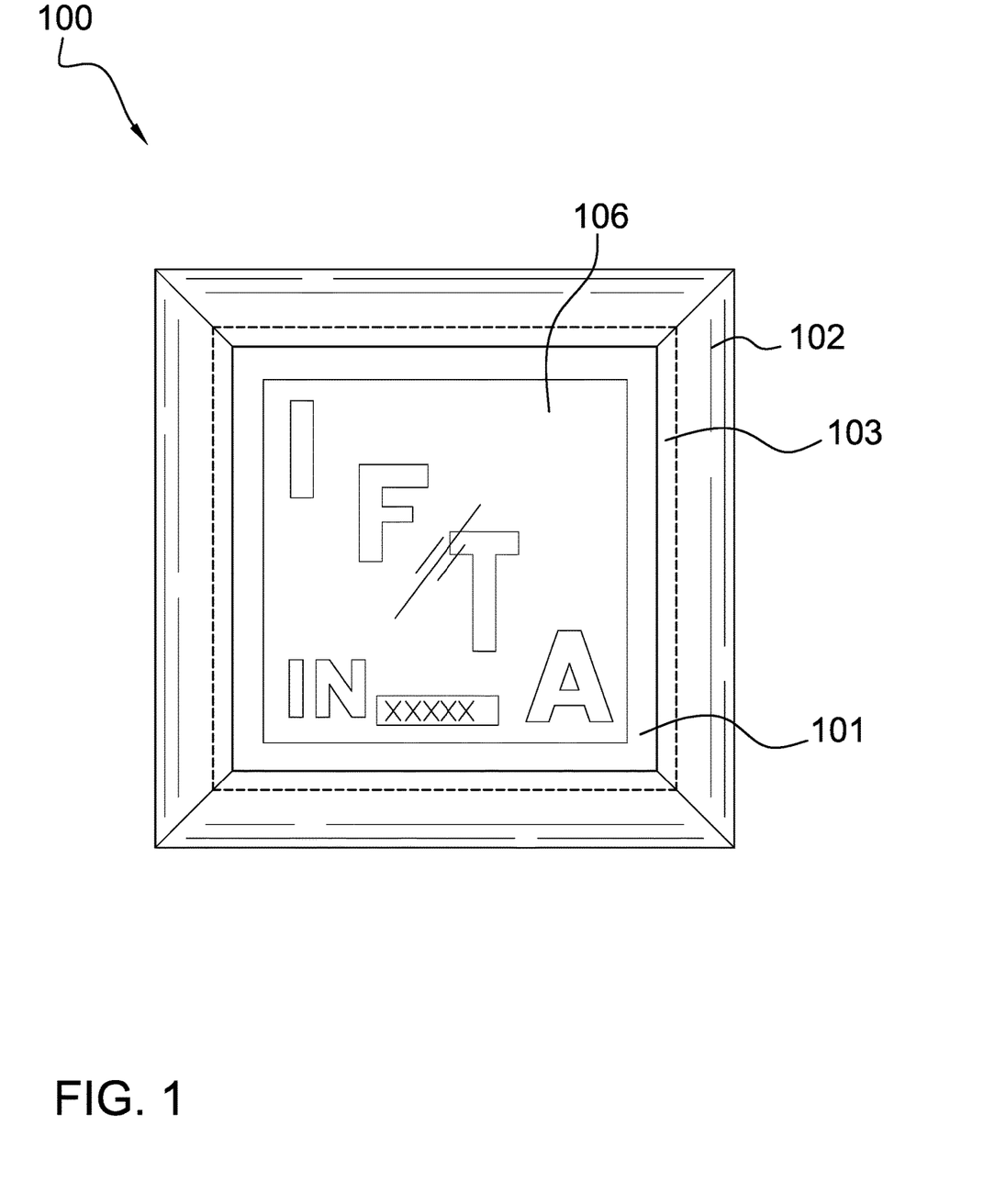
FIG. 1 is a front view of an embodiment of the disclosure.
Figure 2:
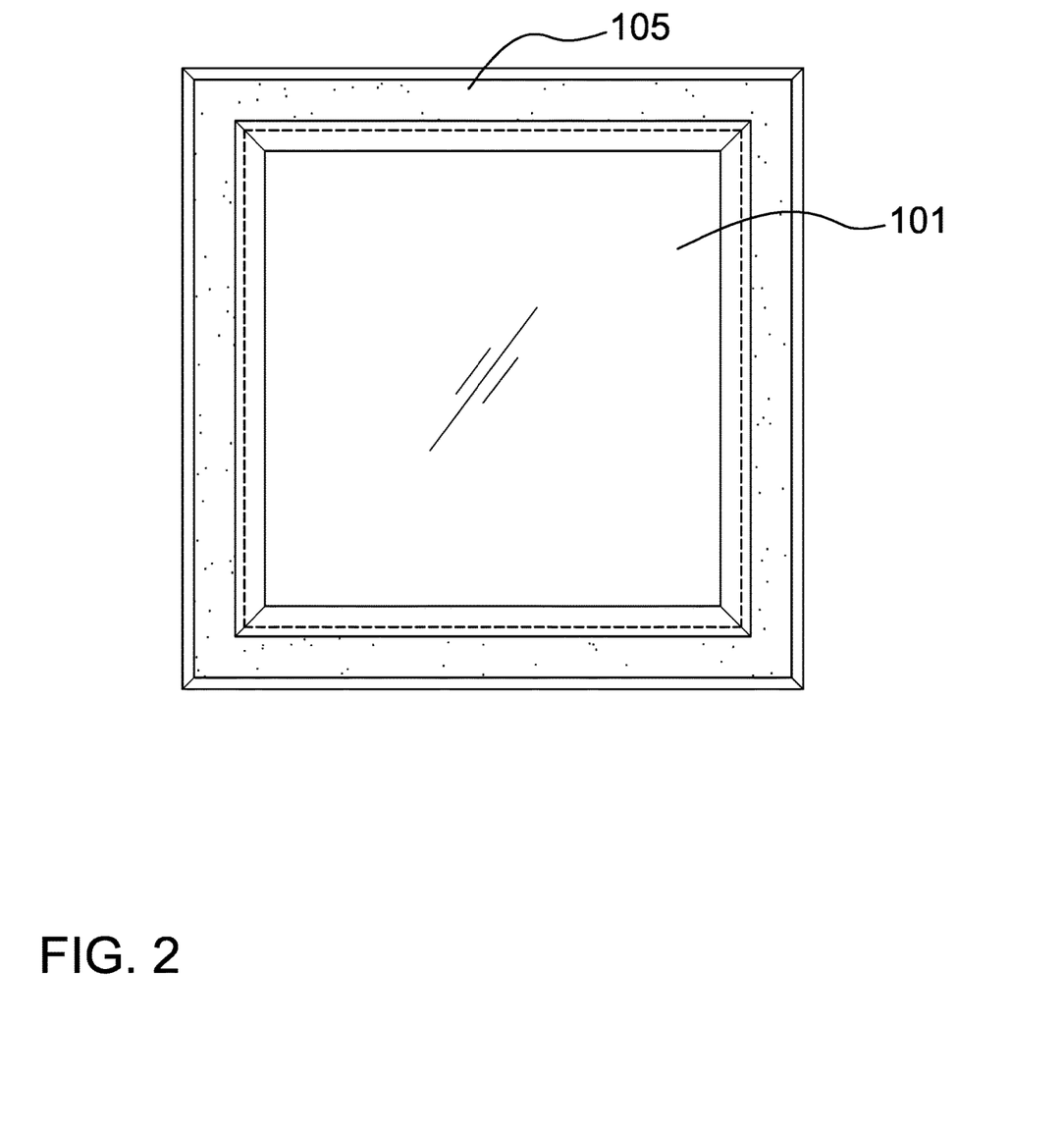
FIG. 2 is a rear view of an embodiment of the disclosure.
Figure 3:
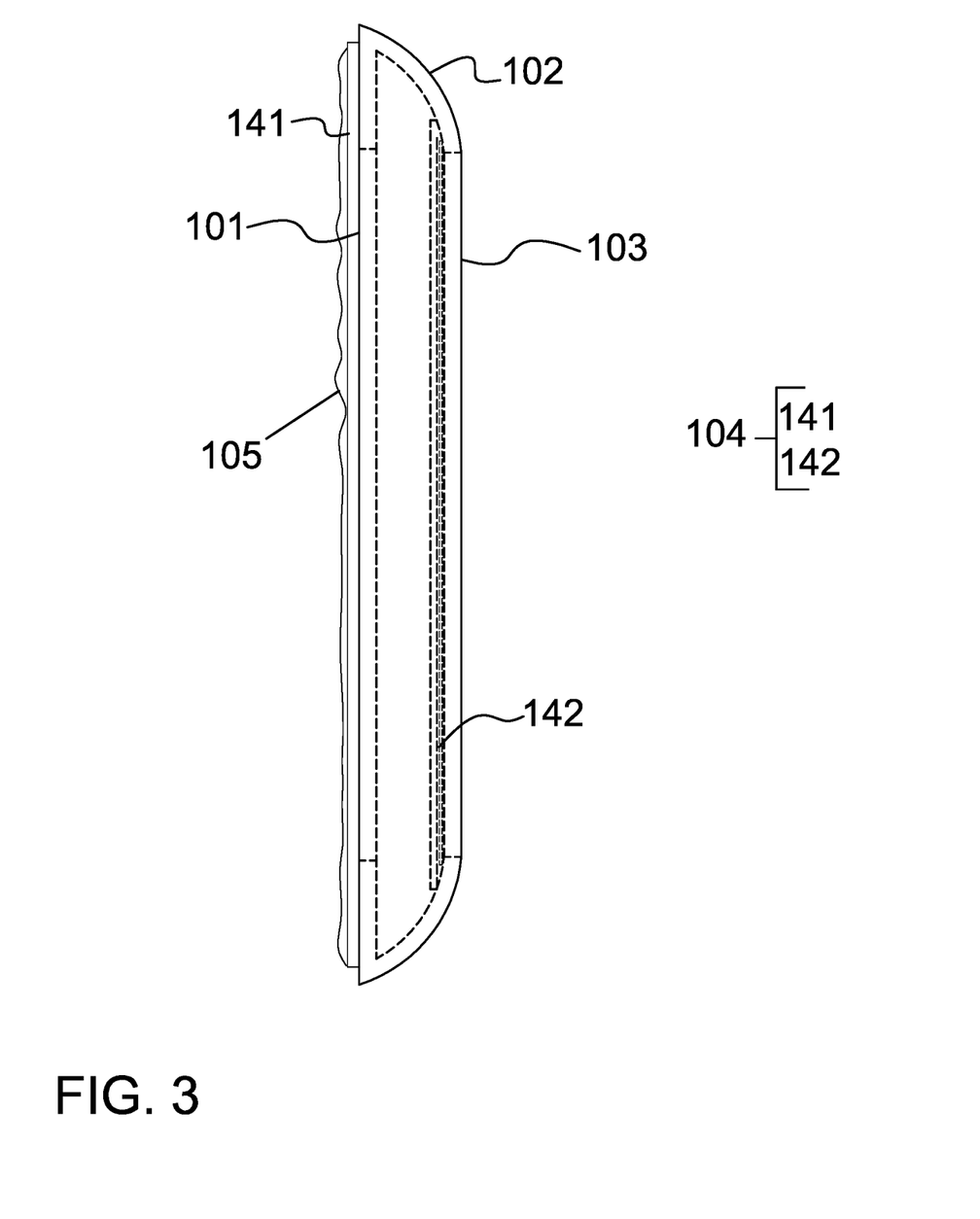
FIG. 3 is a side view of an embodiment of the disclosure.
Figure 4:
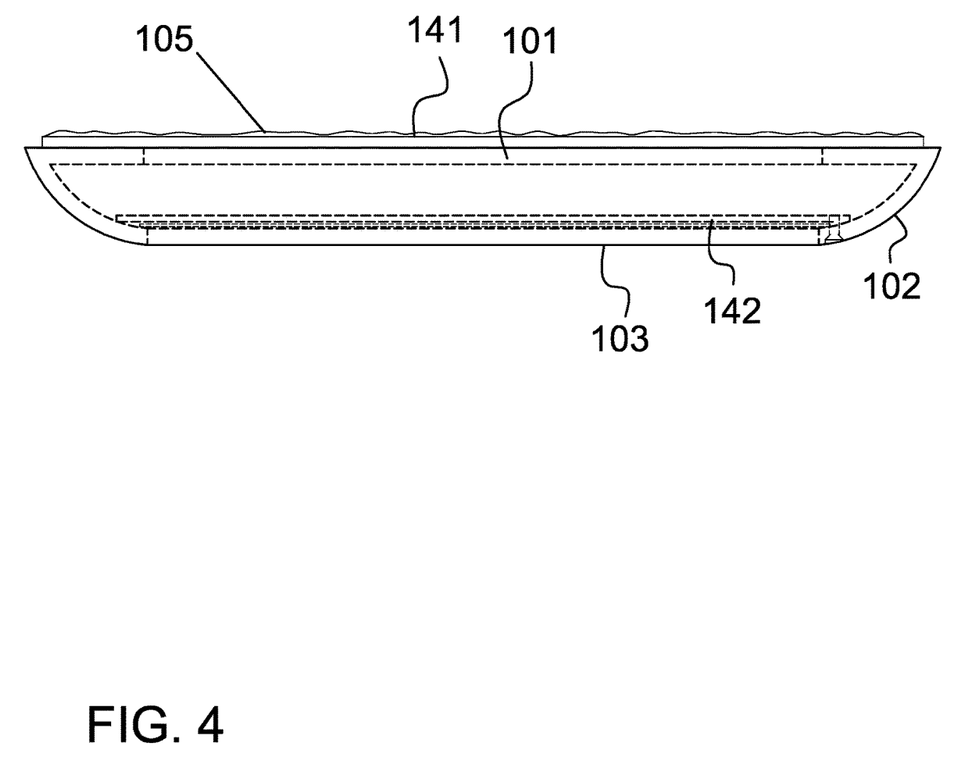
FIG. 4 is a top view of an embodiment of the disclosure.
Figure 5:
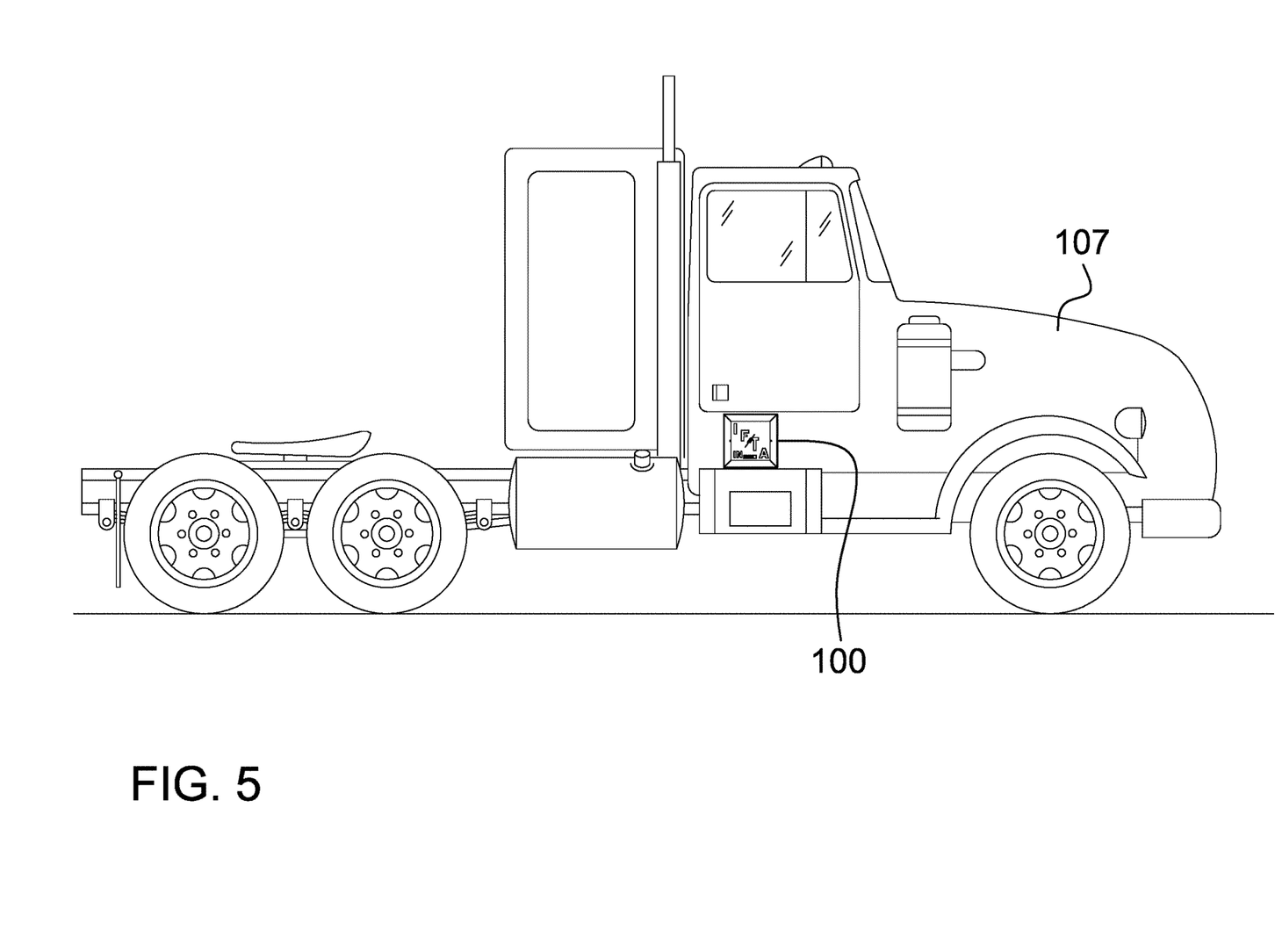
FIG. 5 is an in-use view of an embodiment of the disclosure.

The tractor 107 is a vehicle. The tractor 107 is intended for use on a road network for commercial purposes. The tractor 107 is used to tow a trailer.

The registration sheeting 106 is a license that documents the participation of the tractor 107 in an administrative program. This disclosure assumes that the administrative program is the IFTA.

The display plate structure 101 is a disk shaped structure. The display plate structure 101 is a rigid structure. The display plate structure 101 forms a portion of the barrier that encloses the protected space of the invention 100. The display plate structure 101 forms a display surface on which the registration sheeting 106 mounts. The display plate structure 101 is positioned such that the registration sheeting 106 is visible through the window structure 103 of the invention 100. The display plate structure 101 forms the structure that physically attaches to the exterior surface of the tractor 107.

The bezel structure 102 is a disk shaped structure. The bezel structure 102 is a rigid structure. The bezel structure 102 forms a portion of the barrier that encloses the protected space of the invention 100. The bezel structure 102 is formed as a ring. The bezel structure 102 removably attaches to the display plate structure 101. The bezel structure 102 removably secures the window structure 103 to the display plate structure 101. The bezel structure 102 secures the window structure 103 to the display plate structure 101 such that the registration sheeting 106 is visible through the window structure 103.

The window structure 103 is a disk shaped structure. The window structure 103 is a rigid structure. The window structure 103 forms the balance of the barrier that encloses the protected space of the invention 100. The window structure 103 is a transparent structure. The window structure 103 mounts in the characteristic aperture of the ring shape of the bezel structure 102. The transparent nature of the window structure 103 allows the registration sheeting 106 to be visible from the environment surrounding the invention 100.

Each gasket selected from the plurality of gaskets 104 is a seal. Each selected gasket converts a joint formed in the invention 100 into a fluid impermeable barrier. The joint that is sealed by any gasket selected from the plurality of gaskets 104 is selected from the group consisting of: a) the exterior surface of the tractor 107 and the display plate structure 101; and b) the window structure 103 and the bezel structure 102. The plurality of gaskets 104 comprises a first gasket 141 and a second gasket 142.

The first gasket 141 is a gasket selected from the plurality of gaskets 104. The first gasket 141 forms a fluid impermeable seal between the display plate structure 101 and the exterior surface of the tractor 107. The second gasket 142 is a gasket selected from the plurality of gaskets 104. The second gasket 142 forms a fluid impermeable seal between the window structure 103 and the bezel structure 102.

The fastening structure 105 is a mechanical device. The fastening structure 105 physically attaches the display plate structure 101 to the exterior surface of the tractor 107. The fastening structure 105 permanently attaches the display plate structure 101 to the tractor 107. The fastening structure 105 is likely going to be a layer of adhesive.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Bezel: As used in this disclosure, a bezel is a visible ring formed around the perimeter of a transparent structure.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a surface upon which is presented an image, potentially including, but not limited to, graphic images and text. The image is interpretable by an individual viewing the projected image in a meaningful manner. A display device refers to an electrical device used to present these images.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Fastening Device: As used in this disclosure, a fastening device is a device that is used to join or affix a first object to a second object.

Fuel: As used in this disclosure, fuel refers to a substance that undergoes a chemical combustion reaction to release chemical potential energy.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gasket: As used in this disclosure, a gasket is an elastomeric material that is placed between a first surface and a second surface for the purpose of: 1) creating a liquid or gas impermeable seal between the first surface and the second surface; or, 2) preventing the first surface from damaging the second surface (or vice versa).

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

IFTA: As used in this disclosure, the IFTA refers to the International Fuel Tax Agreement. The IFTA is a legal agreement between 48 states in the United States and 10 provinces in Canada. Alaska, Hawaii, and the Canadian territories do not participate in the IFTA. The IFTA is a common registration mechanism that provides commercial road transportation operators (corporate and individual) with a single process to pay the state and provincial fuel taxes due to each participating state and province. Operators are required to visibly display a registration on the vehicles that they operate.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

License: As used in this disclosure, a license is a registration issued by an appropriate authority. The issued registration is required by an individual to take or perform an action or to own an object. The documentation associated with the issued registration is often referred to as a license. Examples of licenses include driver's licenses, hunting and fishing licenses, vehicle registration licenses, business operating licenses, and licenses to sell controlled substances such as alcohol or pharmaceuticals.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Present: As used in this disclosure, to present means to bring an object, image, or concept to the attention of an individual.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Rigid Structure: As used in this disclosure, a rigid structure is a solid structure formed from an inelastic material that resists changes in shape. A rigid structure will permanently deform as it fails under a force. See bimodal flexible structure.

Ring: As used in this disclosure, a ring is a term that is used to describe a disk-like structure through which a negative space is formed through the faces of the disk-like structure. Rings are often considered loops. The negative space formed through the faces of the disk-like structure is called the characteristic aperture. See Iris Structure Seal: As used in this disclosure, a seal is a structure that forms a fluid impermeable barrier between two objects.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tractor: As used in this disclosure, a tractor is a vehicle having a powerful diesel or gasoline powered engine that is used to tow one or more trailers.

Trailer: As used in this disclosure, a trailer is an unpowered wheeled vehicle that is towed by a powered vehicle such as a tractor. See tongue and intermodal freight container.

Transparent: As used in this disclosure, transparent refers to a material that allows light to pass through the material without significant scattering such that an object can be clearly seen through the material.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Weather: As used in this disclosure, the term weather refers to a collection of measurable parameters of the atmosphere including, but not limited to, temperature, humidity, precipitation, and air movement caused by wind and energy and illumination from the sun. A structure that isolates an individual or object from the more uncomfortable or destructive aspects of the weather is said to provide protection against the weather. The term elements is often used to refer to weather.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A protective frame for vehicle stickers comprising
a display plate structure, a bezel structure, a window structure, a plurality of gaskets, and a fastening structure;
wherein the protective frame for vehicle stickers is configured for use with a registration sheeting;
wherein the registration sheeting mounts on the display plate structure;

wherein the fastening structure secures the protective frame for vehicle stickers to a tractor;

wherein the bezel structure, the window structure, and the plurality of gaskets forms a protected space surrounding the registration sheeting;

wherein the plurality of gaskets comprises a first gasket and a second gasket;

wherein the first gasket is a gasket selected from the plurality of gaskets;

wherein the first gasket forms a fluid impermeable seal between the display plate structure and an exterior surface of the tractor;

wherein the second gasket is a gasket selected from the plurality of gaskets;

wherein the second gasket forms a fluid impermeable seal between the window structure and the bezel structure.

2. The protective frame for vehicle stickers according to claim 1 wherein the protective frame for vehicle stickers is a display;

wherein the protective frame for vehicle stickers displays the registration sheeting;

wherein the protective frame for vehicle stickers is configured for use with a tractor;

wherein the protective frame for vehicle stickers mounts on the exterior surface of the tractor such that the registration sheeting is visibly displayed.

3. The protective frame for vehicle stickers according to claim 2 wherein the display plate structure is a rigid structure;

wherein the display plate structure forms a portion of the barrier that encloses the protected space of the protective frame for vehicle stickers;

wherein the display plate structure forms a display surface on which the registration sheeting mounts;

wherein the display plate structure is positioned such that the registration sheeting is visible through the window structure of the protective frame for vehicle stickers;

wherein the display plate structure forms the structure that physically attaches to the exterior surface of the tractor.

4. The protective frame for vehicle stickers according to claim 3 wherein the bezel structure forms a portion of the barrier that encloses the protected space of the protective frame for vehicle stickers;

wherein the bezel structure is formed as a ring;

wherein the bezel structure removably attaches to the display plate structure;

wherein the bezel structure removably secures the window structure to the display plate structure;

wherein the bezel structure secures the window structure to the display plate structure such that the registration sheeting is visible through the window structure.

5. The protective frame for vehicle stickers according to claim 4 wherein the window structure is a rigid structure;

wherein the window structure forms the balance of the barrier that encloses the protected space of the protective frame for vehicle stickers;

wherein the window structure is a transparent structure;

wherein the window structure mounts in a characteristic aperture of a ring shape of the bezel structure;

wherein the transparent nature of the window structure allows the registration sheeting to be visible from the environment surrounding the protective frame for vehicle stickers.

6. The protective frame for vehicle stickers according to claim 5 wherein each gasket selected from the plurality of gaskets is a seal;

wherein each selected gasket converts a joint formed in the protective frame for vehicle stickers into a fluid impermeable barrier;

wherein the joint that is sealed by any gasket selected from the plurality of gaskets is selected from the group consisting of: a) the exterior surface of the tractor and the display plate structure; and b) the window structure and the bezel structure.

7. The protective frame for vehicle stickers according to claim 6 wherein the fastening structure is a mechanical device;

wherein the fastening structure physically attaches the display plate structure to the exterior surface of the tractor;

wherein the fastening structure permanently attaches the display plate structure to the tractor.

\* \* \* \* \*